United States Patent
Paule

(10) Patent No.: US 10,716,300 B2
(45) Date of Patent: Jul. 21, 2020

(54) ARTIFICIAL BAIT WITH SLIP PROTECTION

(71) Applicant: Lane Andrew Paule, Anchorage, AK (US)

(72) Inventor: Lane Andrew Paule, Anchorage, AK (US)

( * ) Notice: Subject to any disclaimer, the term of this patent is extended or adjusted under 35 U.S.C. 154(b) by 363 days.

(21) Appl. No.: 15/916,484

(22) Filed: Mar. 9, 2018

(65) Prior Publication Data

US 2019/0053477 A1    Feb. 21, 2019

Related U.S. Application Data

(60) Provisional application No. 62/547,031, filed on Aug. 17, 2017.

(51) Int. Cl.
*A01K 85/18*  (2006.01)
*A01K 83/06*  (2006.01)

(52) U.S. Cl.
CPC .............. *A01K 85/18* (2013.01); *A01K 83/06* (2013.01)

(58) Field of Classification Search
CPC ................................ A01K 83/06; A01K 85/18
USPC ........................................................ 43/42.28
See application file for complete search history.

(56) References Cited

U.S. PATENT DOCUMENTS

| | | | | |
|---|---|---|---|---|
| 1,333,318 A | * | 3/1920 | Kijima ................... | A01K 85/12 43/42.13 |
| 3,971,152 A | * | 7/1976 | Husson, Jr. ............ | A01K 85/00 43/42.06 |
| 5,094,026 A | * | 3/1992 | Correll ................... | A01K 85/00 43/42.11 |
| 5,915,944 A | * | 6/1999 | Strunk ................... | A01K 85/00 43/42 |
| 6,922,938 B1 | * | 8/2005 | Ciuffo .................... | A01K 85/00 43/42.15 |
| 8,745,916 B1 | * | 6/2014 | Rutty ..................... | A01K 85/01 43/42.06 |
| 8,910,415 B2 | * | 12/2014 | Farr, Jr. .................. | A01K 85/01 43/42.06 |
| 9,445,583 B1 | * | 9/2016 | Aanenson .............. | A01K 85/00 |
| 2004/0025405 A1 | * | 2/2004 | Rivera Gomez ...... | A01K 85/00 43/42.12 |
| 2006/0016118 A1 | * | 1/2006 | Zuk ........................ | A01K 97/06 43/42.09 |
| 2006/0260179 A1 | * | 11/2006 | Guigo .................... | A01K 85/00 43/42.36 |
| 2018/0125047 A1 | * | 5/2018 | Gierl ...................... | A01K 95/00 |

* cited by examiner

*Primary Examiner* — Claude J Brown
(74) *Attorney, Agent, or Firm* — Michael Carey

(57) ABSTRACT

Methods, systems, and devices for luring fish with an artificial bait are described. An artificial bait may include a top portion, a bottom portion, and a washer to prevent a knotted line from slipping through. In one embodiment, an artificial bait may include a top portion in the form of a tapered cylinder, a bottom portion comprising a plurality of appendages, and a washer. Some examples of the artificial bait may also include one or more fins attached to the top portion. The washer may prevent a fishing line from slipping through the artificial bait when it is being pulled through the water.

18 Claims, 4 Drawing Sheets

ARTIFICIAL BAIT WITH SLIP PROTECTION

CROSS-REFERENCE

This application claims priority to, and the benefit of, U.S. Provisional Application Ser. No. 62/547,031 filed on Aug. 17, 2017, entitled 'GOTEM Baits—Transformer Series'. The entire contents of the foregoing application are hereby incorporated by reference for all purposes.

BACKGROUND

The following relates generally to luring fish, and more specifically to luring fish with an artificial bait. Sports fishermen may use bait to attract fish. Artificial bait may use movement, vibration, and visual appearance to lure fish. Artificial bait may be similar in form to the prey species of the fish to be baited. In some cases, the bait may be made to appeal to a fish's curiosity or aggression.

However, in some cases, a fishing line may pull through a bait, which may damage the bait, prevent fish from being caught by a hook, or detach the bait from the line, which may lead to loss or damage to the bait, fish, or fishing equipment. Thus, there is a need in the art for a bait that prevents the line from pulling through the bait.

SUMMARY

An artificial bait may include a top portion, a bottom portion, and a washer to prevent a knotted line from slipping through. In one embodiment, an artificial bait may include a top portion in the form of a tapered cylinder, a bottom portion comprising a plurality of appendages, and a washer. Some examples of the artificial bait may also include one or more fins attached to the top portion. The washer may prevent a fishing line from slipping through the artificial bait when it is being pulled through the water. The bait in the present disclosure may be used for palegic and non-palegic species (including bottom dwellers).

In one embodiment, an artificial bait may include a top portion in the form of a cylinder, a tapered cylinder, a cone, a truncated cone, a head of an octopus or squid, or any combination thereof, a bottom portion comprising a plurality of appendages, and a washer. A method of making a system for luring fish is described. The method may include providing a top portion in the form of a cylinder, a tapered cylinder, a cone, a truncated cone, a head of an octopus or squid, or any combination thereof, providing a bottom portion comprising a plurality of appendages, and providing a washer. A method of luring fish is also described. The method may include using a top portion in the form of a cylinder, a tapered cylinder, a cone, a truncated cone, a head of an octopus or squid, or any combination thereof, using a bottom portion comprising a plurality of appendages, and using a washer.

In some examples of the artificial bait described above, the top portion, the bottom portion, or both may be formed from an elastic or semi-elastic material. In some examples of the artificial bait described above, the top portion, the bottom portion, or both may be formed from silicone rubber. In some examples of the artificial bait described above, the washer may be embedded in the top portion or the bottom portion. In some examples of the artificial bait described above, the washer may be embedded in the bottom portion.

In some examples of the artificial bait described above, the washer may be between the top portion and the bottom portion.

In some examples, the top portion (i.e., the head) may be formed from an elastic, semi-elastic, or rigid material. For example, the head rigid with flexible, interchangeable "legs" for the bottom portion.

In some examples of the artificial bait described above, the washer may be between the bottom portion and a knot or stop in a leader line (e.g., above the hook). In some examples of the artificial bait described above, the washer may be operable to prevent a knotted line from pulling through the apparatus when being pulled through water. In some examples of the artificial bait described above, the washer may be formed from a material having a rigidity greater than a rigidity of the top portion and the bottom portion. In some examples of the artificial bait described above, the washer comprises a stainless steel washer. In some examples of the artificial bait described above, the washer comprises a hard plastic material.

In some examples of the artificial bait described above, the top portion, the bottom portion, and the washer each may have a hole for threading a fishing line. In some examples of the artificial bait described above, the bottom portion may be shaped similar to the appendages of a squid or octopus. In some examples of the artificial bait described above, the bottom portion connects or interlocks with the top portion to form a single bait. In some examples of the artificial bait described above, the bottom portion may have a shape and size such that the bottom portion may be partially embedded within the top portion to form a single bait. In some examples of the artificial bait described above, the top portion comprises a lip extending partially into a hole for a leader line, the lip operable to hold the bottom portion in a connected state with the top portion. In some examples of the artificial bait described above, the bottom portion comprises an indentation that interlocks with the lip of the top portion to hold the bottom portion in a connected state with the top portion. In some examples of the artificial bait described above, the bottom portion may be fused to the top portion to form a single bait.

In some examples of the artificial bait described above, the bottom portion may have a different color from the top portion. In some examples of the artificial bait described above, the top portion, the bottom portion, or both may be formed using photoluminescent material, solid color material, mixed color material, UV reactive pigment, or any combination thereof. In some examples of the artificial bait described above, the top portion comprises one or more eye components.

In some examples of the artificial bait described above, the one or more eye components comprise a different color from a color of the top portion, a cavity in the top portion, a different material than the top portion, or any combination thereof. In some examples of the artificial bait described above, the one or more eye components may be formed using photoluminescent material, solid color material, mixed color material, UV reactive pigment, or any combination thereof.

Some examples of the artificial bait described above may also include a weighting component embedded within the top portion. In some examples of the artificial bait described above, the weighting component may be removable from the top portion. In some examples of the artificial bait described above, the weighting component comprises a material having a higher density than a material of the top portion. Some examples of the artificial bait described above may also include one or more fins attached to the top portion. In some examples of the artificial bait described above, the one or more fins may be operable to stabilize the apparatus when pulled through water. In some examples of the artificial bait described above, the top portion may have a weight asymmetry, wherein the weight asymmetry may be operable to stabilize the apparatus when pulled through water.

Some examples of the artificial bait described above may also include a leader line, wherein the leader line runs through the top portion, the bottom portion and the washer and includes at least one knot or stop. Some examples of the artificial bait described above may also include a weight swivel connected to the leader line. Some examples of the artificial bait described above may also include a hook connected to the leader line. In some examples of the artificial bait described above, the knot or stop may be located between the washer and the hook.

DETAILED DESCRIPTION

Sports fishermen may use bait to attract fish. The five main types of fish in sport fishing are marlin, tuna, sailfish, shark, and mackerel. Natural bait may be made from a prey species of the fish to be baited. Artificial bait may use movement, vibration, and visuals to bait fish. The bait may be similar in form to the prey species of the fish to be baited. In some cases, the bait may be made to appeal to a fish's curiosity or aggression. The bait may use powered mechanisms to generate movement, or they may be moved by the fisherman. The bait may be chained together to mimic schools of fish. The use of artificial bait may mitigate some of the problems of over-harvesting bait species. Artificial bait may also improve survival of fish that are caught and released by reducing the incidence of fatal deep-hooking.

An artificial bait may include a top portion, a bottom portion, and a washer to prevent a knotted line from slipping through. The top portion of the bait may represent the head of an octopus or squid. The top portion may be hollow to house components of the bait. Weights may be placed in the top portion to affect the bait action. The top portion may have stabilizing fins and a head that is heavier on one side to promote a straight path in water. The bottom portion of the bait may represent the appendages of an octopus or squid. A washer may be positioned between the top portion and the bottom portion. The washer may prevent a line from pulling through the bait. The bait appearance may be customizable. The top and bottom portions of the bait may be swappable. In some examples, the portions of the bait may use glowing, solid color pigment, UV, or fluorescent materials to attain any color combination. A leader line may be threaded through each portion of the bait. Additionally, the bait may use a weight swivel and hook. The leader line may have several knots to adjust hook and swivel position. The bait may use differing leaders or riggings.

Figure 1:
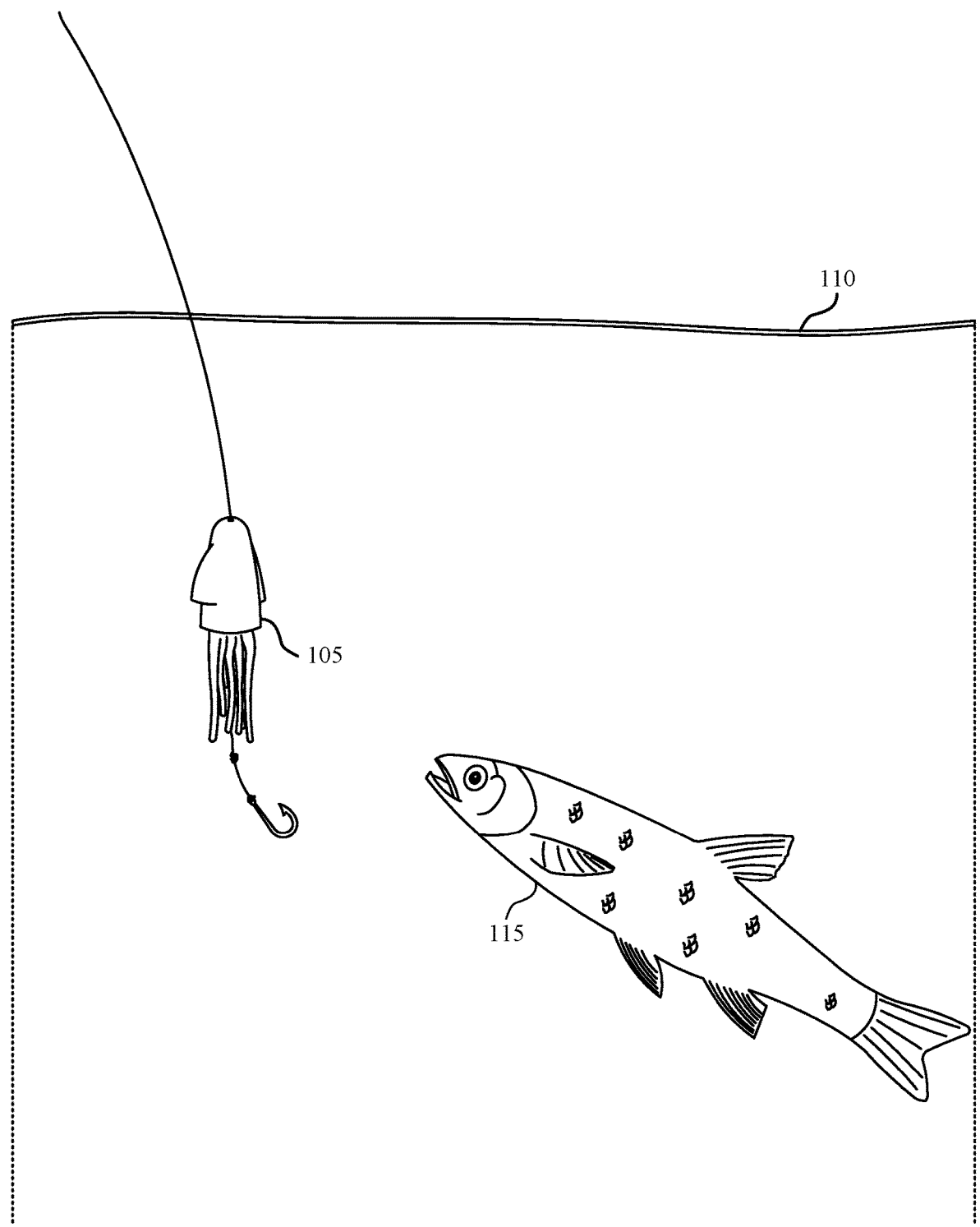
FIG. 1 shows a sport fishing system that supports luring fish with an artificial bait in accordance with aspects of the present disclosure.

FIG. 1 shows a sport fishing system that supports luring fish 115 with an artificial bait 105 in accordance with aspects of the present disclosure. Sport fishing system may represent the following components: artificial bait 105, body of water 110, and fish 115.

Artificial bait 105 may use movement, vibration, and visuals to bait fish 115. The bait may be similar in form to the prey species of the fish 115 to be baited. In some cases, the bait may be made to appeal to a fish's curiosity or aggression. The bait may use powered mechanisms to generate movement, or they may be moved by the fisherman. The bait may be chained together to mimic schools of fish 115. The use of artificial bait 105 may mitigate some of the problems of over-harvesting bait species. Artificial bait 105 may also improve survival of fish 115 that are caught and released by reducing the incidence of fatal deep-hooking. An artificial bait 105 may include a top portion, a bottom portion, and a washer to prevent a knotted line from slipping through. The bait appearance may be customizable. The top and bottom portions of the bait may be swappable. In some examples, the portions of the bait may use glowing, solid color pigment, UV, or fluorescent materials to attain any color combination.

Figure 2:
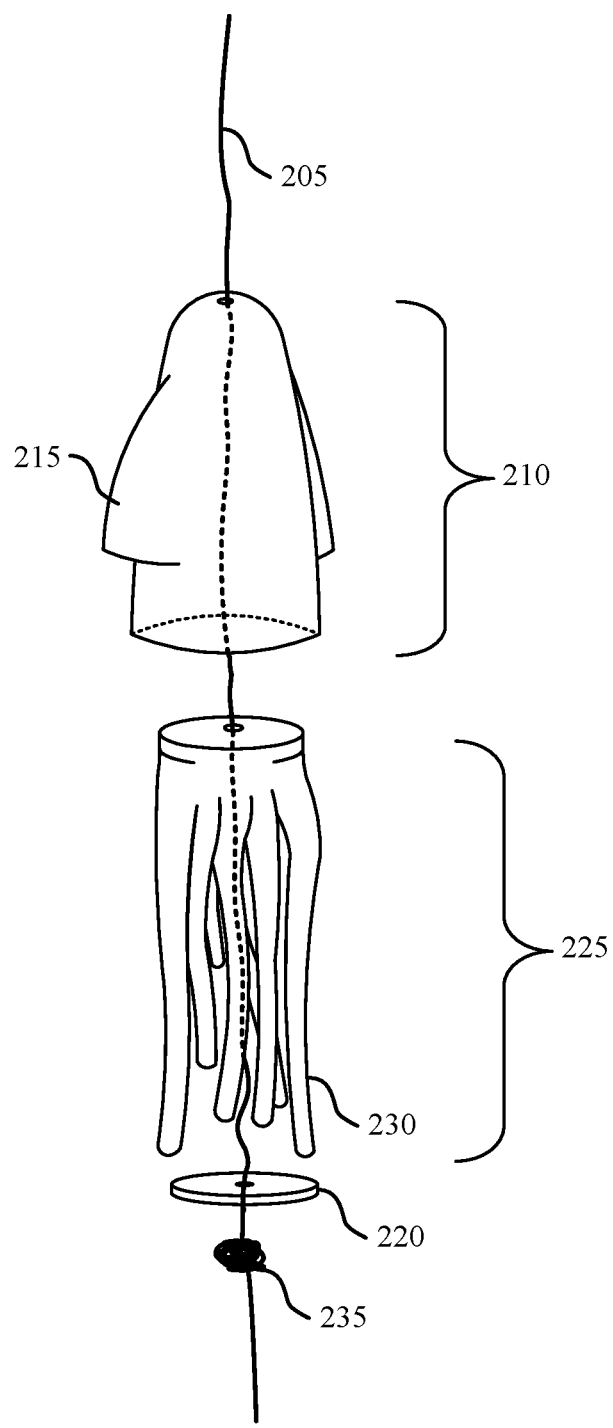
FIG. 2 shows a bait system that supports luring fish with an artificial bait in accordance with aspects of the present disclosure.

FIG. 2 shows a bait system that supports luring fish with an artificial bait in accordance with aspects of the present disclosure. Bait system may represent the following components: leader line 205, top portion 210, washer 220, bottom portion 225, and knot or stop 235.

Leader line 205 may be an example of a component, wherein the leader line 205 runs through the top portion 210, the bottom portion 225 and the washer 220 and includes at least one knot or stop 235. A leader line 205 may be threaded through each portion of the bait. Additionally, the bait may use a weight swivel and hook. The leader line 205 may have several knot or stops 235 to adjust hook and swivel position. The bait may use differing leaders or riggings. In some cases, the knot or stop 235 is located between the washer 220 and a hook attached to the leader line 205.

Top portion 210 may be an example of a component in the form of a cylinder, a tapered cylinder, a cone, a truncated cone, a head of an octopus or squid, or any combination thereof. In some examples, top portion 210 may include fin 215. In some cases, the top portion 210 comprises a lip extending partially into a hole for a leader line 205, the lip operable to hold the bottom portion 225 in a connected state with the top portion 210. In some cases, the top portion 210 comprises one or more eye components. In some cases, the top portion 210 has a weight asymmetry, wherein the weight asymmetry is operable to stabilize the apparatus when pulled through water. The top portion 210 of the bait may represent the head of an octopus or squid. The top portion 210 may be hollow to house components of the bait. The top portion 210 may have stabilizing fins 215 and a head that is heavier on one side to promote a straight path in water. In some cases, weights and/or scent pads may be placed in the top portion 210.

Fins 215 may be an example of one or more components attached to the top portion 210. In some cases, the one or more fins 215 are operable to stabilize the apparatus when pulled through water.

Washer 220 may be an example of a component of artificial bait. In some cases, the washer 220 is embedded in the top portion 210 or the bottom portion 225. In some cases, the washer 220 is embedded in the bottom portion 225. In some cases, the washer 220 is between the top portion 210 and the bottom portion 225. In some cases, the washer 220 is between the bottom portion 225 and a knot or stop 235 in a leader line 205. In some cases, the washer 220 is operable to prevent a knotted line from pulling through the apparatus when being pulled through water. In some cases, the washer 220 is formed from a material having a rigidity greater than a rigidity of the top portion 210 and the bottom portion 225. In some cases, the washer 220 comprises a stainless steel washer 220. In some cases, the washer 220 comprises a hard plastic material. A washer 220 may be positioned between the top portion 210 and the bottom portion 225. The washer 220 may prevent a line from pulling through the bait.

Bottom portion 225 may be an example of a component comprising a plurality of appendages 230. In some examples, bottom portion 225 may include appendage 230. In some cases, the top portion 210, the bottom portion 225, or both are formed from an elastic or semi-elastic material. In some cases, the top portion 210, the bottom portion 225, or both are formed from silicone rubber. In some cases, the top portion 210, the bottom portion 225, and the washer 220 each have a hole for threading a fishing line. In some cases, the bottom portion 225 is shaped similar to the appendages 230 of a squid or octopus. In some cases, the bottom portion 225 connects or interlocks with the top portion 210 to form a single bait. In some cases, the bottom portion 225 has a shape and size such that the bottom portion 225 may be partially embedded within the top portion 210 to form a single bait. In some cases, the bottom portion 225 comprises an indentation that interlocks with the lip of the top portion 210 to hold the bottom portion 225 in a connected state with the top portion 210. In some cases, the bottom portion 225 is fused to the top portion 210 to form a single bait. In some cases, the bottom portion 225 has a different color from the top portion 210.

In some cases, the top portion 210, the bottom portion 225, or both are formed using photoluminescent material, solid color material, mixed color material, UV reactive pigment, or any combination thereof. The bottom portion 225 of the bait may represent the appendages 230 of an octopus or squid. In some cases, a scent pad or weight is located between the top portion 210 and bottom portion 225 (not shown).

Figure 3:
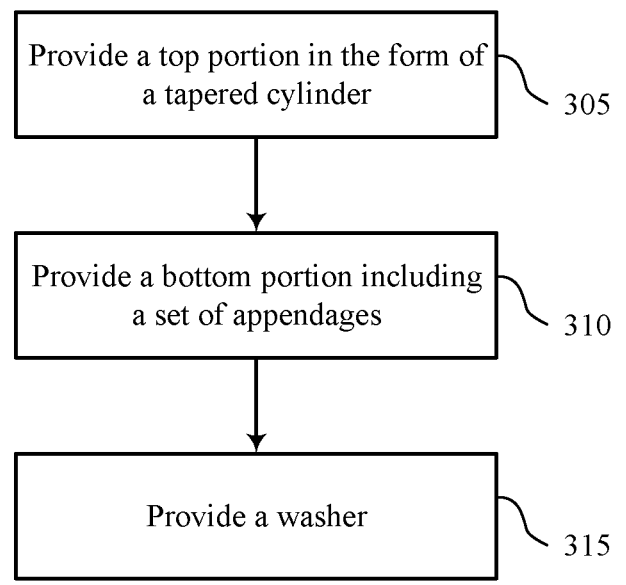
FIGS. 3 through 4 show flowcharts that support luring fish with an artificial bait in accordance with aspects of the present disclosure.
Figure 3:
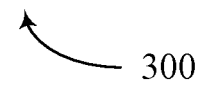

FIG. 3 shows a flowchart 300 that supports luring fish with an artificial bait in accordance with aspects of the present disclosure. In some examples, portions of this process may be performed manually, In some examples, an automated system or apparatus may execute a set of codes to control the functional elements of the device to perform the described functions. Additionally or alternatively, the system or apparatus may perform aspects of the functions described below using special-purpose hardware.

At block 305 the system or apparatus may provide a top portion in the form of a tapered cylinder. The operations of this block may be performed according to the methods and processes described in the present disclosure. For example, the operations of this block may be composed of various substeps, or may be performed in conjunction with other operations described herein. In certain examples, aspects of the described operations may be performed by a top portion as described with reference to FIG. 2.

At block 310 the system or apparatus may provide a bottom portion comprising a plurality of appendages. The operations of this block may be performed according to the methods and processes described in the present disclosure. For example, the operations of this block may be composed of various substeps, or may be performed in conjunction with other operations described herein. In certain examples, aspects of the described operations may be performed by a bottom portion as described with reference to FIG. 2.

At block 315 the system or apparatus may provide a washer (between the top portion and the bottom portion or between the bottom portion and the knot or stop). The operations of this block may be performed according to the methods and processes described in the present disclosure. For example, the operations of this block may be composed of various substeps, or may be performed in conjunction with other operations described herein. In certain examples, aspects of the described operations may be performed by a washer as described with reference to FIG. 2.

Figure 4:
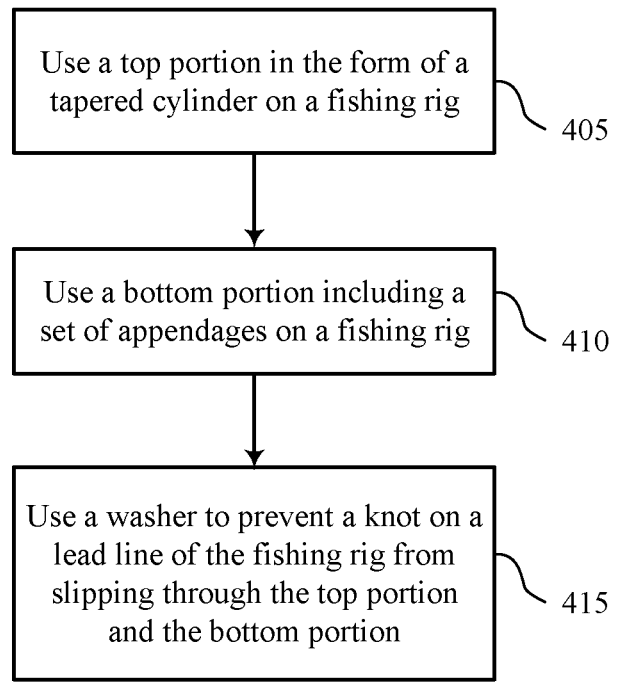

FIG. 4 shows a flowchart 400 that supports luring fish with an artificial bait in accordance with aspects of the present disclosure.

At block 405 the system or apparatus may use a top portion in the form of a tapered cylinder on a fishing rig. The operations of this block may be performed according to the methods and processes described in the present disclosure. For example, the operations of this block may be composed of various substeps, or may be performed in conjunction with other operations described herein. In certain examples, aspects of the described operations may be performed by a top portion as described with reference to FIG. 2.

At block 410 the system or apparatus may use a bottom portion comprising a plurality of appendages on a fishing rig. The operations of this block may be performed according to the methods and processes described in the present disclosure. For example, the operations of this block may be composed of various substeps, or may be performed in conjunction with other operations described herein. In certain examples, aspects of the described operations may be performed by a bottom portion as described with reference to FIG. 2.

At block 415 the system or apparatus may use a washer (between the top portion and the bottom portion or between the bottom portion and the knot or stop) to prevent a knot or stop on a lead line of the fishing rig from slipping through the top portion and the bottom portion. The operations of this block may be performed according to the methods and processes described in the present disclosure. For example, the operations of this block may be composed of various substeps, or may be performed in conjunction with other operations described herein. In certain examples, aspects of the described operations may be performed by a washer as described with reference to FIG. 2.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. An apparatus for luring fish, comprising:
    a top portion in the form of a cylinder, a tapered cylinder, a cone, a truncated cone, a head of an octopus or squid, or any combination thereof;
    a bottom portion comprising a plurality of appendages, wherein the top portion comprises a lip extending partially into a hole for a leader line, the lip operable to hold the bottom portion in a connected state with the top portion; and
    a washer.

2. The apparatus of claim 1, wherein:
    the top portion, the bottom portion, or both are formed from an elastic or semi-elastic material.

3. The apparatus of claim 2, wherein:
    the top portion, the bottom portion, or both are formed from silicone rubber.

4. The apparatus of claim 1, further comprising:
    a weight located between the top portion and bottom portion.

5. The apparatus of claim 1, wherein:
    the washer is between the top portion and the bottom portion.

6. The apparatus of claim 1, wherein:
    the washer is between the bottom portion and a knot or stop in a leader line.

7. The apparatus of claim 1, wherein:
    the top portion, the bottom portion, and the washer each have a hole for threading a fishing line.

8. The apparatus of claim 1, wherein:
    the bottom portion is shaped similar to the appendages of a squid or octopus.

9. The apparatus of claim 1, wherein:
    the bottom portion connects or interlocks with the top portion to form a single bait.

10. The apparatus of claim 1, wherein:
    the bottom portion has a shape and size such that the bottom portion may be partially embedded within the top portion to form a single bait.

11. The apparatus of claim 1, wherein:
    the bottom portion comprises an indentation that interlocks with the lip of the top portion to hold the bottom portion in a connected state with the top portion.

12. The apparatus of claim 1, wherein:
    the bottom portion is fused to the top portion to form a single bait.

13. The apparatus of claim 1, wherein:
    the top portion, the bottom portion, or both are formed using photoluminescent material, solid color material, mixed color material, UV reactive pigment, or any combination thereof.

14. The apparatus of claim 1, wherein:
    the top portion comprises one or more eye components.

15. The apparatus of claim 14, wherein:
    the one or more eye components are formed using photoluminescent material, solid color material, mixed color material, UV reactive pigment, or any combination thereof.

16. The apparatus of claim 1, further comprising:
    a weighting component embedded within the top portion.

17. The apparatus of claim 1, further comprising:
    one or more fins attached to the top portion.

18. The apparatus of claim 1, further comprising:
    a leader line, wherein the leader line runs through the top portion, the bottom portion and the washer and includes at least one knot or stop;
    a weight swivel connected to the leader line; and
    a hook connected to the leader line.

* * * * *